US005513379A

United States Patent [19]
Benveniste et al.

[11] Patent Number: 5,513,379
[45] Date of Patent: Apr. 30, 1996

[54] APPARATUS AND METHOD FOR DYNAMIC RESOURCE ALLOCATION IN WIRELESS COMMUNICATION NETWORKS UTILIZING ORDERED BORROWING

[75] Inventors: Mathilde Benveniste, South Orange; Albert G. Greenberg, Millburn; Frank K. Hwang, Warren; Boris D. Lubachevsky, Bridgewater; Paul E. Wright, Basking Ridge, all of N.J.

[73] Assignee: AT&T Corp., Murray Hill, N.J.

[21] Appl. No.: 238,138

[22] Filed: May 4, 1994

[51] Int. Cl.⁶ .................................................. H04Q 7/00
[52] U.S. Cl. ...................... 455/33.1; 455/33.2; 455/33.4; 455/56.1
[58] Field of Search .................. 455/33.1, 33.2, 455/33.4, 50.1, 54.1, 56.1, 62, 63, 67.1, 67.3; 379/58, 59, 60

[56] References Cited

U.S. PATENT DOCUMENTS

| | | | |
|---|---|---|---|
| 3,764,915 | 10/1993 | Cox et al. | 455/33.1 |
| 5,239,676 | 8/1993 | Strawczynski et al. | 455/56.1 |
| 5,239,682 | 8/1993 | Strawczynski et al. | 455/62 |
| 5,276,730 | 1/1994 | Cimini, Jr. et al. | 455/33.1 |
| 5,276,908 | 1/1994 | Koohgoli et al. | 455/62 |
| 5,280,630 | 1/1994 | Wang | 455/56.1 |
| 5,309,503 | 5/1994 | Bruckert et al. | 455/33.2 |

*Primary Examiner*—Reinhard J. Eisenzopf
*Assistant Examiner*—Marsha D. Banks-Harold

[57] ABSTRACT

A communications system and method of ordered borrowing which facilitates dynamic access to a global channel set that has been partitioned into subsets, with each cell of the system being assigned a particular subset of the channel set. The assignment of channel subsets is performed in such a way as to respect various constraints imposed by the physical layout. Calls originating in a cell are first assigned to the channels allocated to the base station of that cell, in an order determined by the cell. Once the allotted channels are exhausted, i.e. in the busy state, the cell attempts to borrow channels from those allotted to the base stations of neighboring cells in a specified order. The borrowing cell borrows a specified number of channels from each neighbor before returning to a particular cell to borrow additional channels. The channels borrowed from a neighbor are accessed in an order which is substantially the reverse of the order in which they are accessed by the owner cell. This prescribes, for each cell, a prespecified order in which the entire set of channels may be accessed by calls originating in that cell.

19 Claims, 8 Drawing Sheets

| $i$ | $\gamma$ | $\alpha_0$ | $\alpha_1$ | $\alpha_2$ | $\alpha_3$ | $\alpha_4$ | $\alpha_5$ | $\alpha_6$ | $\alpha_7$ | $\alpha_8$ | $\alpha_9$ | $\alpha_{10}$ | $\alpha_{11}$ | $\alpha_{12}$ | $\alpha_{13}$ | $\alpha_{14}$ | $\alpha_{15}$ | $\alpha_{16}$ | $\alpha_{17}$ | $\alpha_{18}$ |
|---|---|---|---|---|---|---|---|---|---|---|---|---|---|---|---|---|---|---|---|---|
| 1 | 21 | 1 | 3 | 5 | 7 | 9 | 11 | 13 | 15 | 17 | 19 | 21 | 23 | 25 | 27 | 29 | 31 | 33 | 35 | 37 |
| 2 | 3 | 2 | 4 | 6 | 8 | 10 | 12 | 14 | 16 | 18 | 20 | 22 | 24 | 26 | 28 | 30 | 32 | 34 | 36 | 38 |
| 3 | 4 | 4 | 6 | 8 | 10 | 12 | 14 | 16 | 18 | 20 | 22 | 24 | 26 | 28 | 30 | 32 | 34 | 36 | 38 | 2 |
| 4 | 5 | 6 | 8 | 10 | 12 | 14 | 16 | 18 | 20 | 22 | 24 | 26 | 28 | 30 | 32 | 34 | 36 | 38 | 2 | 4 |
| 5 | 6 | 8 | 10 | 12 | 14 | 16 | 18 | 20 | 22 | 24 | 26 | 28 | 30 | 32 | 34 | 36 | 38 | 2 | 4 | 6 |
| 6 | 7 | 10 | 12 | 14 | 16 | 18 | 20 | 22 | 24 | 26 | 28 | 30 | 32 | 34 | 36 | 38 | 2 | 4 | 6 | 8 |
| 7 | 8 | 12 | 14 | 16 | 18 | 20 | 22 | 24 | 26 | 28 | 30 | 32 | 34 | 36 | 38 | 2 | 4 | 6 | 8 | 10 |
| 8 | 9 | 14 | 16 | 18 | 20 | 22 | 24 | 26 | 28 | 30 | 32 | 34 | 36 | 38 | 2 | 4 | 6 | 8 | 10 | 12 |
| 9 | 10 | 16 | 18 | 20 | 22 | 24 | 26 | 28 | 30 | 32 | 34 | 36 | 38 | 2 | 4 | 6 | 8 | 10 | 12 | 14 |
| 10 | 11 | 18 | 20 | 22 | 24 | 26 | 28 | 30 | 32 | 34 | 36 | 38 | 2 | 4 | 6 | 8 | 10 | 12 | 14 | 16 |
| 11 | 12 | 20 | 22 | 24 | 26 | 28 | 30 | 32 | 34 | 36 | 38 | 2 | 4 | 6 | 8 | 10 | 12 | 14 | 16 | 18 |
| 12 | 13 | 22 | 24 | 26 | 28 | 30 | 32 | 34 | 36 | 38 | 2 | 4 | 6 | 8 | 10 | 12 | 14 | 16 | 18 | 20 |
| 13 | 14 | 24 | 26 | 28 | 30 | 32 | 34 | 36 | 38 | 2 | 4 | 6 | 8 | 10 | 12 | 14 | 16 | 18 | 20 | 22 |
| 14 | 15 | 26 | 28 | 30 | 32 | 34 | 36 | 38 | 2 | 4 | 6 | 8 | 10 | 12 | 14 | 16 | 18 | 20 | 22 | 24 |
| 15 | 16 | 28 | 30 | 32 | 34 | 36 | 38 | 2 | 4 | 6 | 8 | 10 | 12 | 14 | 16 | 18 | 20 | 22 | 24 | 26 |
| 16 | 17 | 30 | 32 | 34 | 36 | 38 | 2 | 4 | 6 | 8 | 10 | 12 | 14 | 16 | 18 | 20 | 22 | 24 | 26 | 28 |
| 17 | 18 | 32 | 34 | 36 | 38 | 2 | 4 | 6 | 8 | 10 | 12 | 14 | 16 | 18 | 20 | 22 | 24 | 26 | 28 | 30 |
| 18 | 19 | 34 | 36 | 38 | 2 | 4 | 6 | 8 | 10 | 12 | 14 | 16 | 18 | 20 | 22 | 24 | 26 | 28 | 30 | 32 |
| 19 | 20 | 36 | 38 | 2 | 4 | 6 | 8 | 10 | 12 | 14 | 16 | 18 | 20 | 22 | 24 | 26 | 28 | 30 | 32 | 34 |
| 20 | 2 | 38 | 2 | 4 | 6 | 8 | 10 | 12 | 14 | 16 | 18 | 20 | 22 | 24 | 26 | 28 | 30 | 32 | 34 | 36 |
| 21 | 22 | 3 | 5 | 7 | 9 | 11 | 13 | 15 | 17 | 19 | 21 | 23 | 25 | 27 | 29 | 31 | 33 | 35 | 37 | 1 |
| 22 | 23 | 5 | 7 | 9 | 11 | 13 | 15 | 17 | 19 | 21 | 23 | 25 | 27 | 29 | 31 | 33 | 35 | 37 | 1 | 3 |
| 23 | 24 | 7 | 9 | 11 | 13 | 15 | 17 | 19 | 21 | 23 | 25 | 27 | 29 | 31 | 33 | 35 | 37 | 1 | 3 | 5 |
| 24 | 25 | 9 | 11 | 13 | 15 | 17 | 19 | 21 | 23 | 25 | 27 | 29 | 31 | 33 | 35 | 37 | 1 | 3 | 5 | 7 |
| 25 | 26 | 11 | 13 | 15 | 17 | 19 | 21 | 23 | 25 | 27 | 29 | 31 | 33 | 35 | 37 | 1 | 3 | 5 | 7 | 9 |
| 26 | 27 | 13 | 15 | 17 | 19 | 21 | 23 | 25 | 27 | 29 | 31 | 33 | 35 | 37 | 1 | 3 | 5 | 7 | 9 | 11 |
| 27 | 28 | 15 | 17 | 19 | 21 | 23 | 25 | 27 | 29 | 31 | 33 | 35 | 37 | 1 | 3 | 5 | 7 | 9 | 11 | 13 |
| 28 | 29 | 17 | 19 | 21 | 23 | 25 | 27 | 29 | 31 | 33 | 35 | 37 | 1 | 3 | 5 | 7 | 9 | 11 | 13 | 15 |
| 29 | 30 | 19 | 21 | 23 | 25 | 27 | 29 | 31 | 33 | 35 | 37 | 1 | 3 | 5 | 7 | 9 | 11 | 13 | 15 | 17 |
| 30 | 31 | 21 | 23 | 25 | 27 | 29 | 31 | 33 | 35 | 37 | 1 | 3 | 5 | 7 | 9 | 11 | 13 | 15 | 17 | 19 |
| 31 | 32 | 23 | 25 | 27 | 29 | 31 | 33 | 35 | 37 | 1 | 3 | 5 | 7 | 9 | 11 | 13 | 15 | 17 | 19 | 21 |
| 32 | 33 | 25 | 27 | 29 | 31 | 33 | 35 | 37 | 1 | 3 | 5 | 7 | 9 | 11 | 13 | 15 | 17 | 19 | 21 | 23 |
| 33 | 34 | 27 | 29 | 31 | 33 | 35 | 37 | 1 | 3 | 5 | 7 | 9 | 11 | 13 | 15 | 17 | 19 | 21 | 23 | 25 |
| 34 | 35 | 29 | 31 | 33 | 35 | 37 | 1 | 3 | 5 | 7 | 9 | 11 | 13 | 15 | 17 | 19 | 21 | 23 | 25 | 27 |
| 35 | 36 | 31 | 33 | 35 | 37 | 1 | 3 | 5 | 7 | 9 | 11 | 13 | 15 | 17 | 19 | 21 | 23 | 25 | 27 | 29 |
| 36 | 37 | 33 | 35 | 37 | 1 | 3 | 5 | 7 | 9 | 11 | 13 | 15 | 17 | 19 | 21 | 23 | 25 | 27 | 29 | 31 |
| 37 | 38 | 35 | 37 | 1 | 3 | 5 | 7 | 9 | 11 | 13 | 15 | 17 | 19 | 21 | 23 | 25 | 27 | 29 | 31 | 33 |
| 38 | 1 | 37 | 1 | 3 | 5 | 7 | 9 | 11 | 13 | 15 | 17 | 19 | 21 | 23 | 25 | 27 | 29 | 31 | 33 | 35 |

*FIG. 8*

APPARATUS AND METHOD FOR DYNAMIC RESOURCE ALLOCATION IN WIRELESS COMMUNICATION NETWORKS UTILIZING ORDERED BORROWING

BACKGROUND OF THE INVENTION

1. Field of the Invention

The present invention relates generally to communications networks and, more particularly, to an apparatus and method for dynamically allocating resources within such networks to achieve increased efficiency in resource utilization.

2. Description of the Related Art

A communications network supplies a communication path between two or more end users and typically has the capacity to connect only a finite amount of communication traffic at any given instant. Each call consumes some portion of the total available communication resources. In this regard, it will be observed that there are two primary communication resources to be employed in any communication system, namely, average transmitted power and channel bandwidth.

The average transmitted power is the average power of the transmitted signal. The channel bandwidth defines the range of frequencies that the channel can handle for the transmission of signals with satisfactory fidelity. A general system design objective is to use these two resources as efficiently as possible. In most systems, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitted power determines the signal-to-noise ratio at the receiver input. This, subsequently, determines the noise performance of the receiver. Unless performance exceeds a certain design level, the transmission of message signals over the channel is not considered to be satisfactory. Additionally, channel bandwidth is important because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

In any event, as utilized herein, the term "resource" should be understood as being inclusive of, but not limited to, an RF channel (e.g. a set of frequencies or time slots as in Frequency Division Multiple Access—FDMA, Time Division Multiple Access—TDMA, and hybrids thereof), a code associated with a user for the purposes of facilitating communication (as is utilized, for example, in a Direct Sequence Code Division Multiple Access system—CDMA), and a hopping sequence (i.e., an ordinal list specifying the order in which a given set of entities, a set of frequencies, for example, may be accessed in succession for the purposes of communication), as is employed in a Frequency Hopped Spread Spectrum (FHSS) scheme.

A network may be viewed as having a number of base stations. Each base station receives communications from several input ports and distributes these communications among several output ports. The end parties to a call communicate directly with their respective base stations. In some cases, the calling and called parties utilize the same network base station. However, in other cases communication paths are established between diverse base stations, perhaps through intermediary base stations.

When a communications network is configured to accommodate mobile end users, the need to conserve network resources increases. The service area is partitioned into connected service domains known as cells. Within a particular cell, radiotelephone users communicate via radio links with a base station (BS) serving that cell, the base station being connected to other base stations of the radio network. To communicate using this radio network, each user is assigned one of a discrete set of channels. When mobile end users are involved, RF links are typically used to communicate with the end users. These RF links represent scarce resources which must be conserved to the maximum extent possible. Since the end users are mobile, the locations of called parties cannot be determined simply by examining data describing the called parties' identities. Hence, additional network resources must be consumed and additional intelligence must be designed into the network to determine how to service a "roaming" subscriber whose location varies.

The conservation of network resources becomes especially difficult in a network where at least some of the base stations of the network are themselves mobile. This situation may occur, for example, when satellites in moving orbits are used as network base stations. In this situation, the selection of particular network base stations to use in establishing communication paths depends upon which satellites are in convenient locations at the instant a communication is delivered. Moreover, the communication path definitions change from instant to instant as the satellites travel in their orbits. This instant-to-instant change can simultaneously affect thousands or even millions of communication paths through the network. The network resources needed to coordinate the instant-to-instant changes for a multitude of communication paths can potentially be great enough to make operation of the network impractical.

In the context of wireless, terrestrial-based FDMA/TDMA communication systems, Fixed Channel Allocation (FCA) is presently used to obtain access to the channels in the cells in substantially all systems deployed around the world. With FCA, a fixed set of channels are assigned to each cell. Specifically, efficient use of available resources is attempted by designating co-user cells that are sufficiently separated spatially so that the combined interference generated by all co-user cells, as well as other types of system interference (such as adjacent channel interference) is below tolerable levels. By allowing wider access to channels, trunking efficiencies may be realized, thereby reducing the idle time of channels. Such fixed partitioning of resources is not optimal, however, because a cell is precluded from using resources not initially assigned to it even when such use would not cause a violation of operational constraints. As such, FCA is rigid and not adaptable to satisfying a volatile, shifting channel demand. As the number of subscribers to cellular and personal telecommunication networks increases, the channel demand profile can experience rapid changes. The rigid nature of FCA can be a serious obstacle to providing a communication channel to a mobile user at the time it is needed. Thus, current frequency planning and network control are rapidly becoming impractical and burdensome.

One possible solution to the network management problems created by increased call volume is Dynamic Channel Allocation (DCA) where each channel is available for use in every cell. Unlike FCA, DCA adapts to local interference and traffic conditions. However, channel quality can be impaired by a channel in a nearby cell and/or a weak signal strength, and a channel quality level which is below threshold will prevent a channel from being immediately accessed by an incoming user.

It is therefore an object of the present invention to optimally utilize an available resource, such as the RF spectrum, by providing a scheme which is capable of dynamically allocating resources among the cells of a communication network while respecting the operational constraints thereof.

SUMMARY OF THE INVENTION

The aforementioned object, as well as others which will become apparent herein, is achieved by a system and method which facilitates dynamic access to a global channel set which has been partitioned into subsets, with each cell of the system being assigned a particular subset of the channel set. As utilized herein, the term "channel" should be understood as being merely an illustrative example of a resource which may be dynamically allocated in accordance with a ground based cellular system in accordance with the present invention. Moreover, the term "cell" should be understood not only to refer to one- and two-dimensional land-based cellular systems utilizing fixed-position base stations, but also to three-dimensional systems in which the base stations are movable within the service volume or relative to a terrestrial service area. It will, therefore, be readily appreciated by those skilled in the art that the system and method of the present invention may be employed in the allocation of other resources, including resources in a space-based satellite system in which the locations of the base stations relative to the user are themselves dynamic, or in a personal communications system inside a building or other structure.

In any event, the assignment of channel subsets is performed in such a way as to respect various constraints imposed by the physical layout. Examples of such restraints are co-channel interference and adjacent channel interference restrictions. Different size channel sets may be assigned to different base stations. Additionally, the assignment need not repeat in a uniform fashion throughout the region served by the network.

Calls originating in a cell are first assigned to the channels allocated to the base station of that cell, in an order determined by the cell. Once the allotted channels are exhausted, i.e. in the busy state, the call attempts to borrow channels from those allotted to the base stations of neighboring cells in a specified order. For the purposes of the present invention, the set of neighbors of a given cell may be defined as follows, utilizing cell (1) as an example. For every channel set C, other than the channel set owned by cell (1), another cell such as cell (2) is considered a neighboring cell if it owns channel set C and is sufficiently close to channel (1) that simultaneous use of channel set C in both cells (1) and (2) would violate interference or other operational criteria. If more than one cell owning channel set C exists, only one will be considered a neighbor. The borrowing cell borrows a specified set of channels from each neighbor before returning to a particular cell to borrow additional channels. The channels borrowed from a neighbor are accessed in the order opposite to the order in which they are used by the owner cell. This prescribes for each cell, a prespecified order in which the entire set of channels may be accessed by calls originating in that cell.

The order in which cells are visited for the purpose of borrowing need not be related to the assignment of channel subsets to cells.

If a channel sought for use is already in use or reserved by the owner cell or one of its neighbors, one of the following actions occurs: (i) a reservation for the channel is placed by the originating cell while it continues to seek a channel further in its access list; or (ii) if the number of outstanding reservations in the originating cell exceeds a prespecified limit, the call is blocked.

When a call terminates, the last channel acquired is freed through an intra-cell handoff and that call is transferred to the channel just vacated. That is, the calls in progress are allocated to the available channels via a stack discipline. Thus, if there are C channels in all, n channels in use and k channels reserved, in a given cell whose channel access order is $\alpha=(\alpha(1), \alpha(2), \ldots, \alpha(C))$, then the channels in use or reserved are precisely $(\alpha(1), \alpha(2), \ldots, \alpha(k+n+2)$ and additional calls will be assigned to channels $(\alpha(k+n+1), \alpha(n+2), \ldots, \alpha(C))$ in that order.

If a call carried on a channel that was reserved by other cells terminates, one of these outstanding reservations is grained. In the cell in which the reservation request is granted, the last channel acquired in that cell is freed through an intra-cell handoff and that call transferred to the newly granted reserved channel. The quality of the hand-off is improved if intra-cell handoffs are accomplished through remote radio retuning.

In order to facilitate distributed implementation of the method and to minimize the flow of information required between the base stations (centers for control and transmission/reception) located, in different cells, the following device is employed. An operation $\psi$ is defined on channel access orders. That is, given a pair of access orders $\alpha_1$, $\alpha_2$ used by two cells labelled 1 and 2 for the purpose of this example, a third list $\alpha_3=\psi(\alpha_1, \alpha_2)$ is produced with the following property: if the numbers of busy or reserved channels in each cell are respectively $m_1$ and $m_2$, cell 1 may borrow a channel from cell 2 (this will be necessarily the channel labeled $\alpha_1(m_1+1)$) if and only if a specific numerical relation exists between the values $\alpha_3(m_1+1)$ and $m_2$. This condition must be met for all instances where cell 2 is a neighbor of cell 1. If this condition is not met for some neighbor and cell 1 does not exceed its predefined limit on the number of reserved channels it may have, $m_1$ is increased by 1, a reservation is placed for the channel labeled $\alpha_1(m_1+1)$, and the process repeated. Otherwise the call attempt is blocked.

This procedure minimizes the information which needs to be communicated between base stations, as the precomputed lists $\psi(\alpha_1, \alpha_2)$ may be stored in each base station for each of its neighbors. Once the call is set up, the only information required to be exchanged between cell 2 and cell 1 is $m_1$ and $m_2$, the state of cells 1 and 2.

The various features of novelty which characterize the invention are pointed out with particularity in the claims annexed to and forming a part of the disclosure.

BRIEF DESCRIPTION OF THE DRAWINGS

For a better understanding of the invention, its operating advantages, and specific objects attained by its use, reference should be had to the descriptive matter in which there are described preferred embodiments of the invention, and to the accompanying drawings, in which:

FIG. 8 is a chart depicting a sample channel access order, derived in accordance with the present invention, for the nineteen cell reuse group depicted in FIG. 7.

DETAILED DESCRIPTION OF THE PREFERRED EMBODIMENTS

Figure 1:
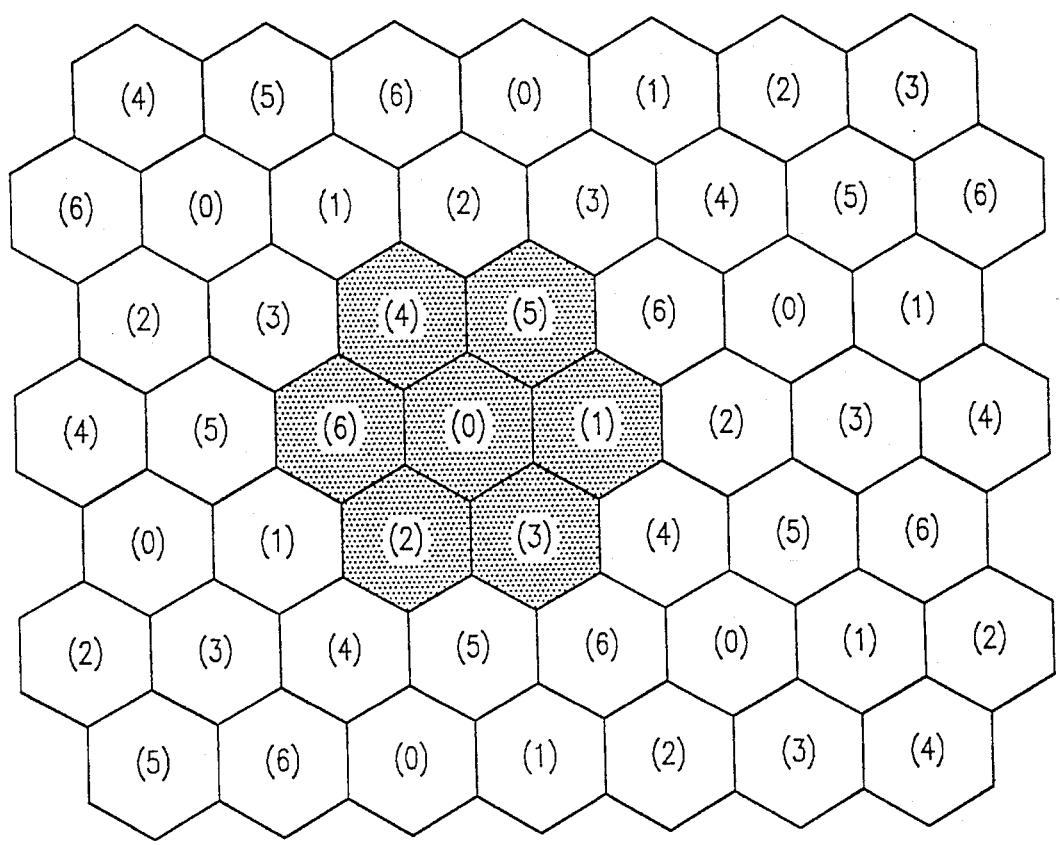
FIG. 1 is a block schematic depicting a regular cell layout (reuse factor 7) of a wireless/cellular radiotelephone system, with a typical reuse group shown as shaded.

A conventional regular hexagonal cell layout of a terrestrial cellular radiotelephone system is shown in schematic form in FIG. 1. Depicting the geographical service area in terms of a hexagonal grid sets a geometric pattern that allows channels to be assigned in a patterned disposition that allows reuse of those channels in a controlled repeatable regular assignment model. Each cell area has a specific set of channels assigned to it. Each channel set comprises a plurality of individual transmit and receive radio channels for use within the cell area. In this model shown in FIG. 1, cells denoted 0 are co-user cells and all use the same channel set. The symbol 0 serves only as an identifier or label of the channel set and does not imply a particular construction thereof. The same description is true for co-user cells denoted 1–6, each cell having assigned thereto a respective channel set. Non-uniform grid designs, which depart from the regular structure depicted in FIG. 1, permit the basic principle embodied in the above description to be adapted to channel availability, blocking and interference constraints. The shaded cells shown in FIG. 1 surrounding a central cell labelled 0 comprise the neighbors of that cell. This cell, together with its neighbors, is commonly referred to as a reuse group.

Figure 2:
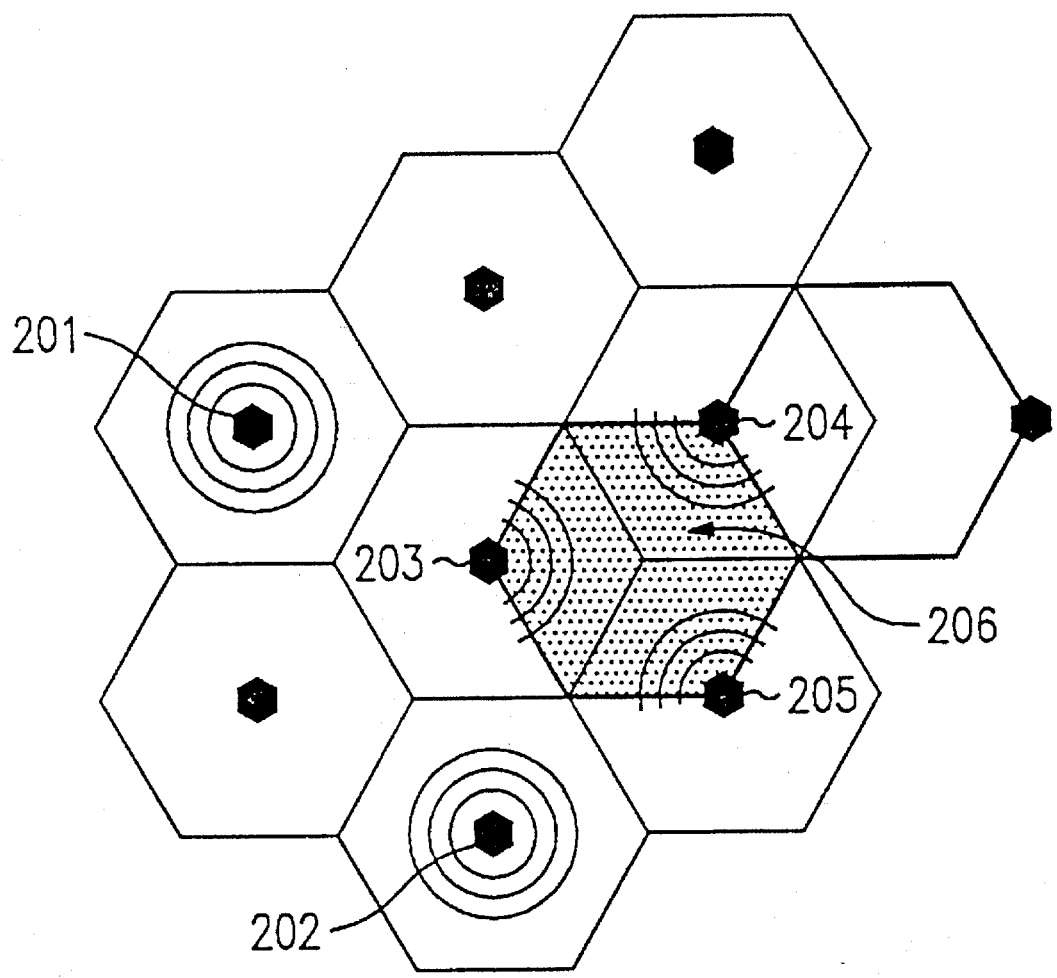
FIG. 2 is a block schematic showing a wireless/cellular radiotelephone system with base stations employing omnidirectional or directional antennas.

Each cell is radiated by an antenna system associated with a base station that includes the radio transceivers. The radio transceivers are, in turn, connected to the public switched telephone network (PSTN) via trunk lines or suitable equivalent. As shown in FIG. 2, the antennas may be either omni-directional, as antennas 201 or 202, or directional, as antennas 203, 204 and 205. Directional antennas 203, 204 and 205 are used to divide or "sectorize" cells into smaller angular wedge type serving areas 206 as illustrated in FIG. 2.

Figure 3:
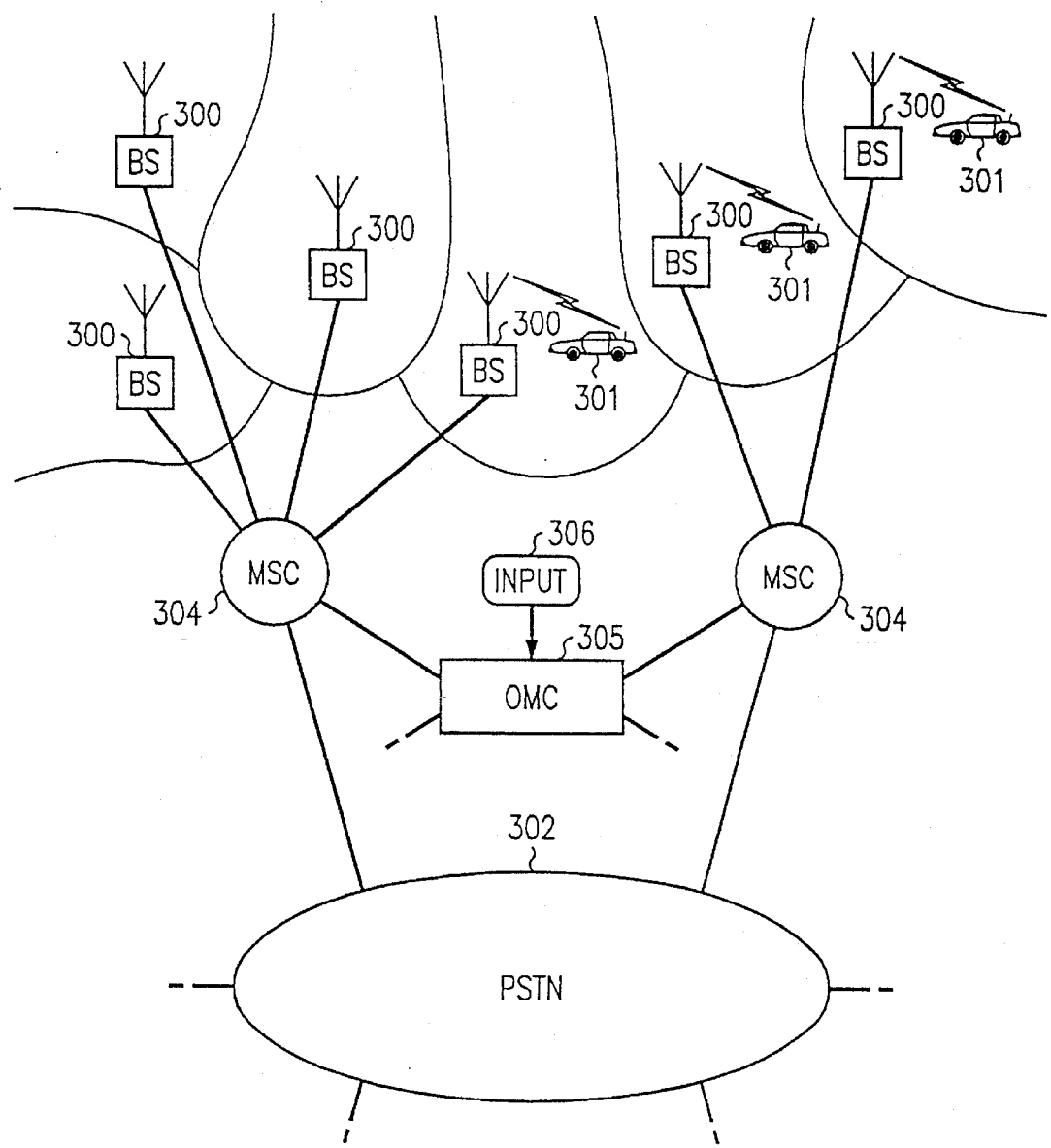
FIG. 3 is a block schematic of a wireless/cellular radiotelephone system.

A typical terrestrial cellular system is illustrated in the block diagram of FIG. 3. Each base station 300 has radio receive/transmit equipment and radiating antennas to provide coverage to cell coverage areas, the boundaries of which are shown as irregular as is typical of an actual system. A mobile unit 301 establishes communication with the base station responsible for the cell coverage area in which it is located. A plurality of mobile switching centers (MSC) 304 are shown connecting the mobile radiotelephone system to the public switched telephone network (PSTN) 302. A plurality of the base stations are interconnected via the switching of the MSC.

An operations and management center (OMC) 305 is coupled to the MSC's 304 to control their system operation and their associated base stations 300. OMC 305 is a central control station which includes data processing equipment and input/output hardware for accepting/delivering data input/output from/to data storage and real time control equipment. This data processing arrangement may be utilized in implementing channel assignments in combination with remotely tunable radio transceivers located at the base stations. In a system with distributed control, some or all of the OMC's functions may be performed by the base stations, with the base stations communicating directly with each other or via a network.

Figure 4:
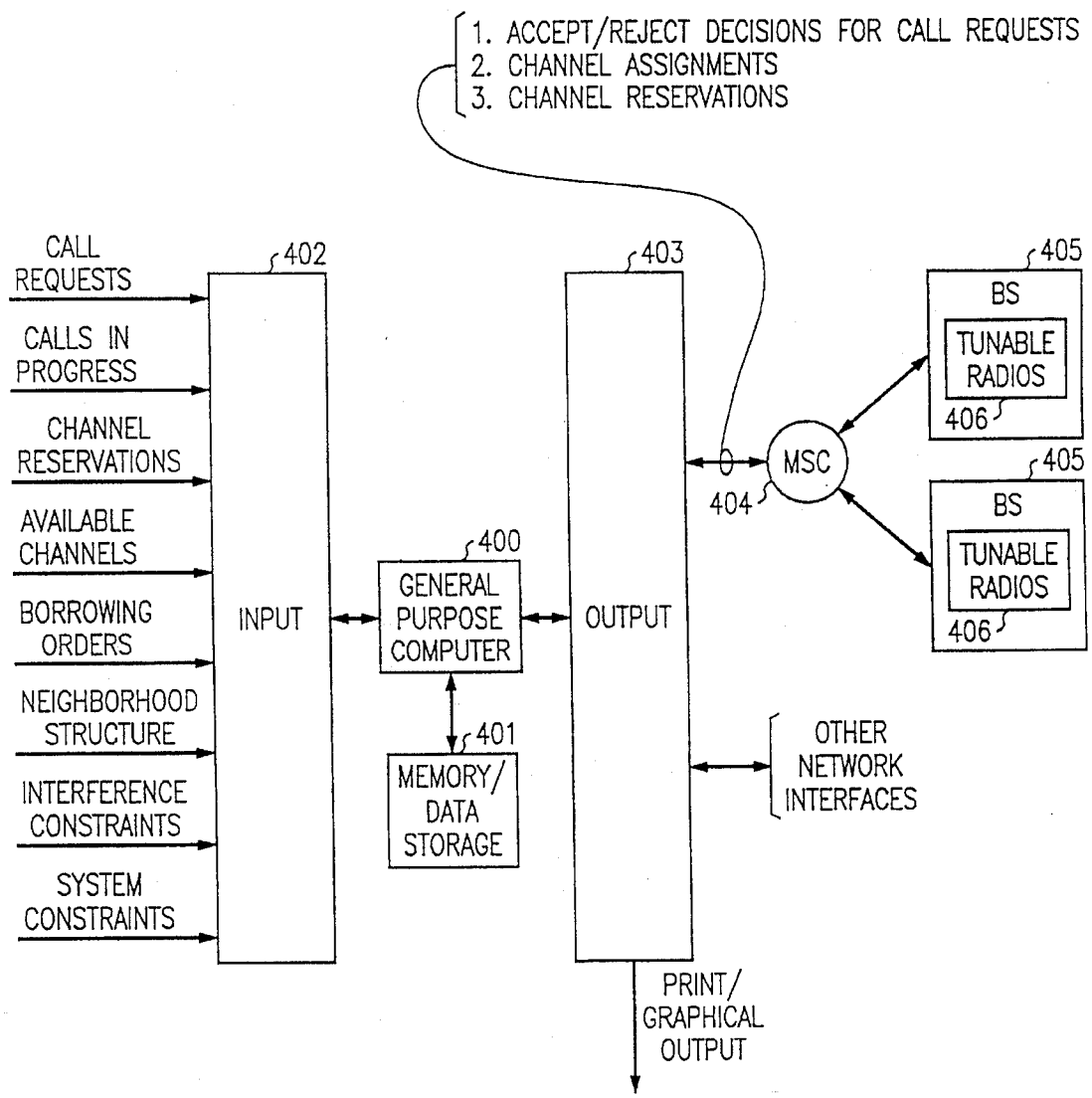
FIG. 4 is a block schematic of a data processing system for assigning channels to call requests in a wireless/cellular radiotelephone system in accordance with the present invention.

An illustrative embodiment of data processing equipment included in the OMC or at individual base stations for the assignment and tuning of radio transceivers at the base stations is shown in block schematic form in FIG. 4. A general purpose computer 400 has a stored program included in its memory or other means of data storage 401. This program includes instructions for performing the assignment of radio channels to call requests based on the operational state of the wireless system. Input data is supplied to the program through the input circuit 402 of the computer. Inputs include the call requests, the channel access orders for the base station of each cell, the number of calls in progress, the available channels and the channel reservations which have been made in each cell. Further inputs include interference information usually in the form of a cell-to-cell interference matrix, which defines the interference to each cell from every other cell. The inputs also include system constraints necessary for channel assignment. System constraints include requirements on blocking probabilities, channel adjacency constraints as well as channel availability restrictions. Traffic usage patterns are also supplied as input and are used to determine the initial allocation of channels to cells. Traffic may be measured in real time.

For the purpose of this discussion, the cells initially allocated to a cell will be referred to as being owned by that cell, and the cell will be referred to as the owner of those channels. In this illustrative embodiment of the invention, the assignment process is performed in the computer 400 according to the instruction contained in memory 401. The resulting assignments of channels to call requests which were accepted, as well as channel reservations in each cell, are output via the output circuitry 403 to the MSC 404 and in turn forwarded to the base stations. The individual tunable radios 406 included in each base station are tuned to the proper channels in accordance with the assignment of radio channels determined by the assignment process. Additional output leads permit graphical and data printouts at the OMC as well as links to other network interfaces for supervision and network control.

To state the above assignment procedure algebraically, the following notation is utilized. Let

| | |
|---|---|
| $j = 1, \ldots, J$ | index of different logical cells (A logical cell is a portion of the coverage area of a cell served by a base station, such as a sector served by a directional antenna.) |
| $i = 1, \ldots, J$ | same as j (the combination (i, j) designates a pair of logical cells) |
| C | number of available channels |
| $a_j$ | maximum number of channels accessible to logical cell j |
| $n_j$ | number of calls in progress in logical cell j |
| $k_j$ | number of outstanding channel reservations in logical cell j |
| $c_j$ | number of channels allocated to logical cell j, chosen in conjunction with $r_j$ below to meet blocking requirements |
| $r_j$ | maximum number of outstanding channel reservations in logical cell j, chosen in conjunction with $c_j$ above to meet blocking requirements |
| $N_j$ | set of neighbors of logical cell j, determined from interference criteria |
| $R_j$ | set of active channel reservations in logical cell j |

Figure 5:
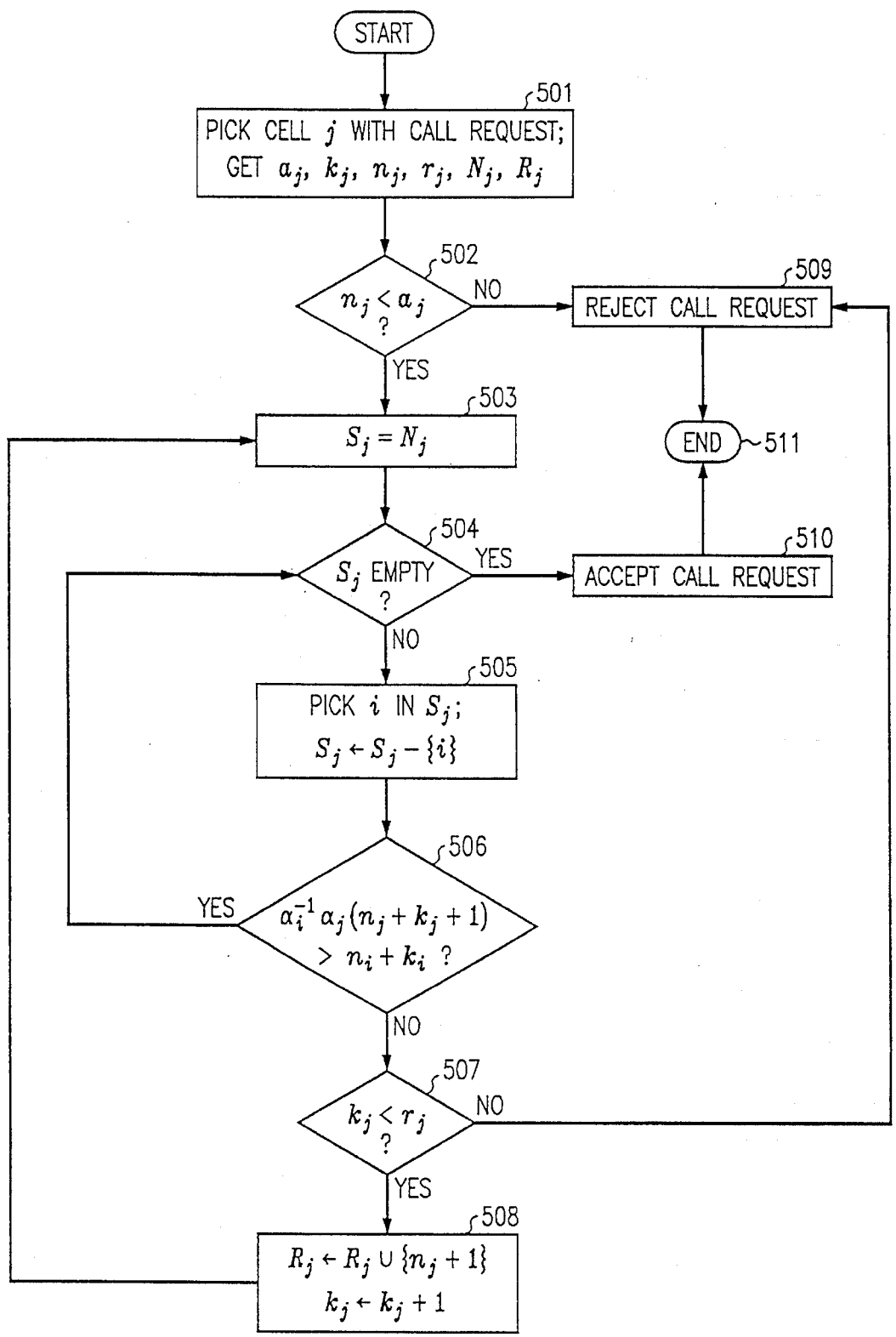
FIG. 5 is a flow process diagram depicting the assignment of channels to calls including channel reservations, if necessary, in accordance with the method of the present invention.

The process for assigning a call request to a channel in a cell j is illustrated in FIG. 5. The channel access orders in each cell are treated as permutations, one of whose mathematical realizations is one-to-one correspondences of the set of integers $\{1, \ldots, C\}$ with itself. Using the algebraic structure imposed by functional composition, operations of 'multiplication' and 'inversion' are defined, which make this set of objects a finite group, consistent with usual mathematical conventions. There are many concrete realizations or representations of this object, as for example using matrices. Nonetheless all are equivalent, in the sense that any one may be substituted for any other for the purpose of implementing the process described below. Using the above concrete mathematical realization, if $\alpha$ and $\beta$ are channel access orders (lists), then the access order $\alpha\beta$ is defined to be that list whose $i^{th}$ element is the element of the list $\alpha$ whose position is given by the $i^{th}$ element of the list $\beta$. Notationally, $\alpha\beta(i)=\alpha(\beta(i))$. This multiplicative relationship is not commutative in that $\alpha\beta$ need not necessarily be equal to $\beta\alpha$, for arbitrary permutations $\alpha$ and $\beta$. The identity element, here denoted $\epsilon$, consists of the list whose $i^{th}$ element equals i. It satisfies the condition $\alpha\epsilon=\epsilon\alpha=\epsilon$. Each permutation $\alpha$ has an inverse permutation $\epsilon$ defined as that unique list such that $\alpha\beta=\beta\alpha=\epsilon$. Moreover, in accordance with mathematical convention the inverse of a permutation such as $\alpha$ is commonly denoted as $\alpha^{-1}$.

Given two lists $\alpha$, $\epsilon$ the algebraic operation specified by $\psi(\alpha,\epsilon)=\epsilon^{-1}\alpha$, produces a third list. In order to verify that the initial segments $(\alpha_j(1), \ldots, \alpha_j(m_j))$ and $(\alpha_i(1), \ldots, \alpha_i(m_i))$, i.e. the first $m_j$ elements of the list $\alpha_j$ and the first $m_i$ elements of the list $\alpha_i$, contain no elements in common, it is necessary and sufficient to have the minimal element of the list $\alpha_i^{-1}\alpha_j(1), \ldots, \alpha_i^{-1}\alpha_j(m_j)$ strictly greater than $m_i$. This condition is symmetric with respect to i and j. Given two initial segments of lists which have no overlap, i.e. no common elements, in order to ascertain that the extension of one of these initial segments by one element (say the extension of the initial segment of $\alpha_j$ to $(\alpha_j(1), \ldots, \alpha j(m_j+1))$ and does not lead to an overlap condition, it suffices to verify only the condition $\alpha_i^{-1}\alpha_j(m_j+1))>m_i$.

The principles of the invention further permit the definition of a different algebraic structure on the set of permutations and the binary operation $\psi$ used to implement conflict detection, in order to reduce computational cost. In particular, the channel set may be partitioned into r classes $H_1, \ldots H_r$, such that the channel set owned by any cell lies wholly within a given partition and cells are allowed to borrow only from other cells which own channel sets within the same partition. Using a one-to-one correspondence of the channels in a given partition $H_t$ with a set of equal cardinality (all choices being mathematically equivalent to the choice $\{1, \ldots, h_t\}$ where $h_t$ denotes the cardinality of $H_t$), the channel access orders may be viewed as permutations of this set and the algebraic operation $\psi$ implemented accordingly. Alternatively, the channel access order of any cell j may be arbitrarily extended beyond the first $\alpha_j$ entries to any permutation on a set of sufficient cardinality to permit the implementation of the binary operation $\psi(\alpha_i,\alpha_j)$ for any cell i where i is a neighbor of j.

According to the principles of this invention, channels are assigned to calls or reserved according to a stack discipline. Thus, if there are C channels in all, $n_j$ channels in use and $k_j$ channels reserved in cell j, whose channel access order is $\alpha_j=(\alpha_j(1),\alpha_j(2), \ldots, \alpha_j(C))$, then the channels in use or reserved are precisely $(\alpha_j(1), \alpha_j(2), \ldots, \alpha_j(k+n))$ and additional calls will be assigned to channels $(\alpha_j(k+n+1),\alpha(k+n+2), \ldots, \alpha_j(C))$ in that order.

After an initial determination 502 that the number of channels allocated in cell j does not exceed an operationally defined maximum $\alpha_j$, each neighbor of cell j is polled to check for possible conflicts, i.e. a channel simultaneously in use in a cell and in a neighbor. This is illustrated in steps 503 through 508. The test 506 is the implementation of the verification of the condition outlined in the previous paragraph to check for such conflicts. If a conflict is detected via this test, this channel for which access was sought is added to the list of outstanding reservations for cell j as shown in steps 507 and 508, if this is permissible, i.e. if the maximum number of reservations is not exceeded. If no further reservations are allowed, then the call request is rejected at 509. If a reservation for the channel is allowed, the channel is reserved and a new cycle of polling neighbors for a channel further in the access order of the requesting cell is begun.

If no conflicts with any neighbor arose during a polling cycle, the call request is accepted at 510 and that channel is assigned to the call. If a call is ultimately rejected, part of the call rejection procedure may optionally include cancelling reservations which were made in an attempt to place that call. These reservations may, however, be retained to reduce the call access time for subsequent channel access attempts. However this may increase blocking probabilities for neighboring cells. The decision on which procedure to adopt may be determined by blocking probability and/or call setup requirements or other operational criteria. The procedure terminates at step 511.

Figure 6:
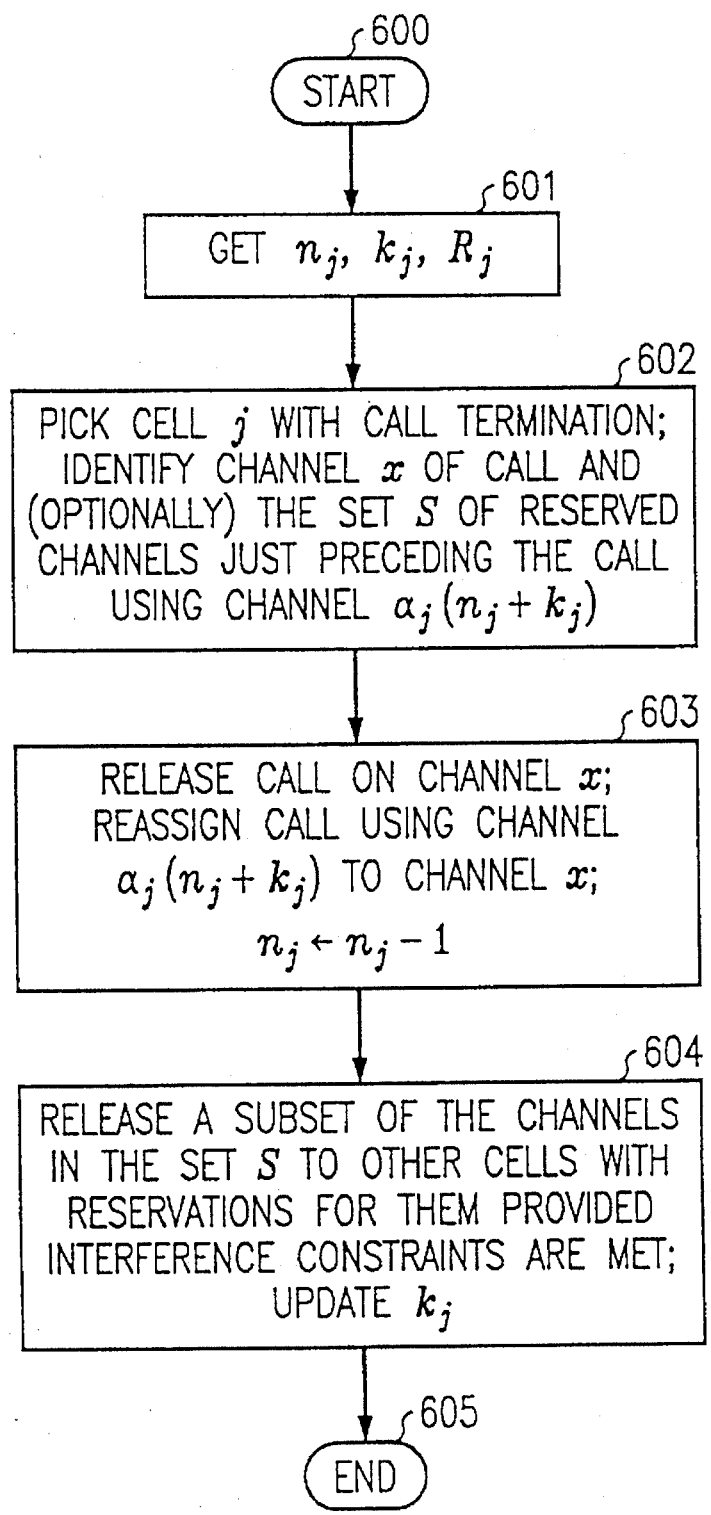
FIG. 6 is a flow process diagram illustrating the release of channels of terminating calls.

FIG. 6 is an illustrative embodiment of the procedure employed in the event of a call termination. The purpose of the procedure is to maintain the stack discipline for the channels which are either in use or reserved. Steps 601 and 602 determine the cell with the terminating call and its parameters. In step 603 the channel used by the terminating call is reassigned to the channel at the top of the stack, i.e. the call using channel $\alpha_j(n_j+k_j)$. It will, of course, be readily ascertained by those skilled in the art that this decision may be deferred and performed at predetermined intervals consistent with system processing constraints or even on an as-needed basis. In practice, the reassignment may be accomplished by remote retuning of the radio transceivers in the base station for that cell as opposed to physically transferring calls between radios. The number of active calls is updated. In step 604, the reserved channels immediately preceding channel $\alpha_j(n_j+k_j)$ are released and $k_j$ updated accordingly.

Figure 7:
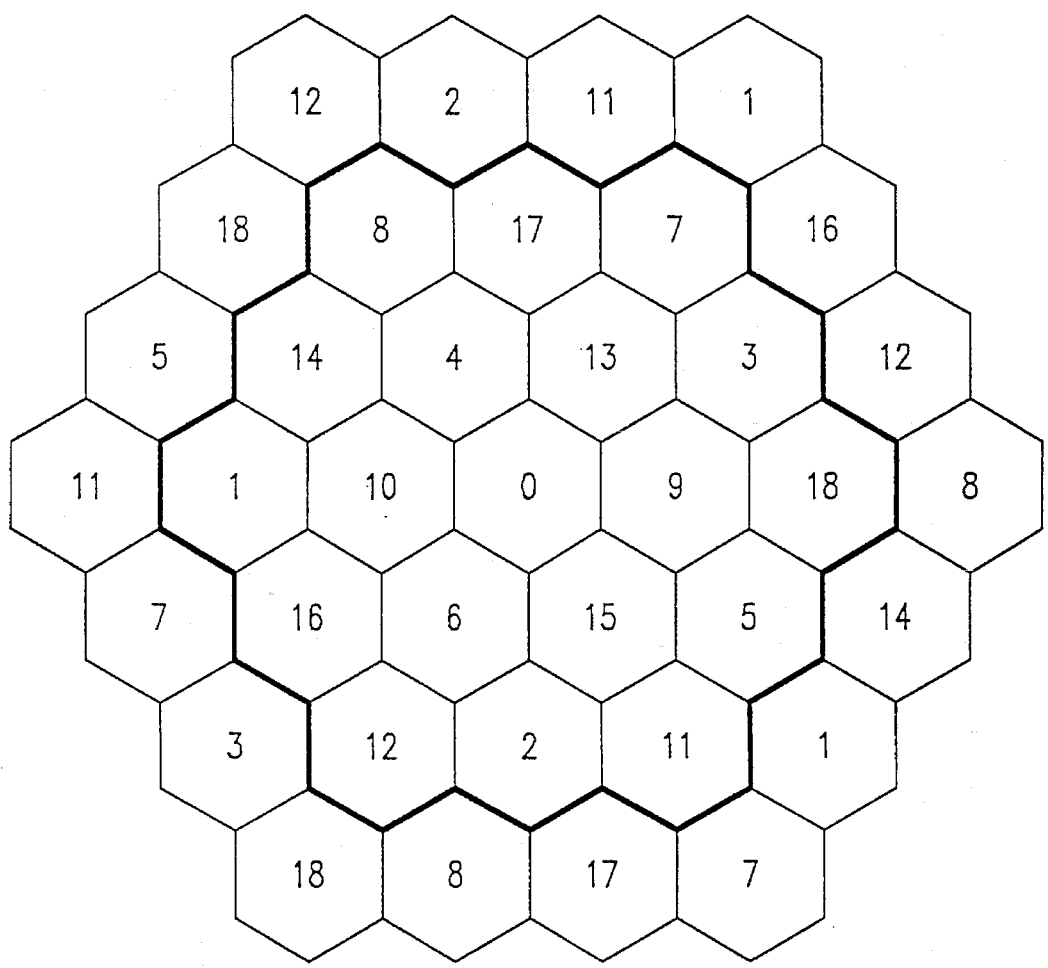
FIG. 7 is a block schematic depicting a nineteen cell reuse group.

With reference now to FIGS. 7 and 8, the concepts of vertical and horizontal channel borrowing will now be described in detail. The following description applies to the allocation of a total of N=M×C channels, M channels per cell, to a reuse group of size C. For the case illustrated in FIGS. 7 and 8, M=2, C=19, and N=38. FIG. 7 is an illustrative example of a 19 cell reuse group. In accordance with the present invention, channels labelled i are initially assigned channel access order $\alpha_i$ as shown, for example, in the 38 channel system of FIG. 8.

Let $\alpha_j$ denote the permutation assigned to cell j, where $-\infty < j < \infty$. Then $\alpha_j = \alpha^j \alpha_0$, where $-\infty < j < \infty$. We may choose the following permutations:

$$\alpha_0(i) = \begin{cases} i, & 1 \leq i \leq M, \\ M[i - M - (j-1)(C-1) + 1] - & M+1+(j-1)(C-1) \leq \\ j + 1, & i < M + j(C-1), \\ & 1 \leq j \leq M, \\ MC - j + 1, & i = M + j(C-1) \\ & 1 \leq j \leq M. \end{cases} \quad (1)$$

$$\alpha_1(i) = \alpha_0(i) + M \bmod N. \quad (2)$$

Then $\alpha = \alpha_1 \alpha_0^{-1}$ has order C:

$$\alpha(i) = M + i \bmod N. \quad (3)$$

We call this latter scheme horizontal borrowing because cell 1 borrows the highest nominal channel assigned to cell 2, then cell 3 and so on. After the list of top channels, i.e. {3M, 4M, ..., CM, M}, has been exhausted, it proceeds to borrow the next highest channels, i.e. {3M−1, 4M−1, ..., CM−1, M−1}. Channels are borrowed in the reverse of the order from which 'owning' cells acquire them.

An alternate scheme, which we call vertical borrowing, is the following.

$$\alpha_0(i) = \begin{cases} i, & 1 \leq i \leq M, \\ (2j+1)M + 1 - i, jM + 1 \leq i \leq (j+1)M, & 1 \leq j \leq C-1 \end{cases} \quad (4)$$

The permutations $\alpha_1$ and $\alpha$ are again given by (2) and (3), respectively.

We note in passing that $\alpha_0$ given above is involutive: $\alpha_0^2 = \epsilon$, so that $\alpha_0^{-1} = \alpha_0$.

The channels nominally assigned to the origin are {1, .., M}, the cell at position 1, {M+1, ..., 2M}, and so on. Channels are accessed in the order in which they are listed. Each site then 'borrows' preferentially from the site to its immediate right, then from the cell two steps to its right, and so on. We call this vertical borrowing because cell 1 borrows the nominal channels assigned to cell 2, i.e. {2M+1, ... 3M}, in the reverse of the order in which cell 2 acquires them, then proceeds to borrow from cell 3 when those channels from cell 2 are exhausted, and so on. Note, however, that if channels are not available from cell 2 because they are in use in cell 2, then cell 1 will not attempt to borrow from cell 3.

The invention is not limited by the embodiments described above which are presented as examples only but can be modified in various ways within the scope of protection defined by the appended patent claims.

What is claimed is:

1. A method for dynamically allocating channels between the cells in a communications network partitioned into a plurality of substantially contiguous cells, each cell having a base station, comprising:

assigning channels to each base station for use by callers within a corresponding cell in accordance with an initial channel assignment scheme satisfying anticipated channel availability, blocking, and interference constraints;

establishing for each base station an initial channel access order establishing an order in which channels allocated during said assigning step are accessed; and reassigning calls to channels not in actual use or held in a reserved state by a given base station, said channels in actual use and said reserved channels being the first channels listed in said initial channel access order established for the given base station.

2. The method according to claim 1, further comprising determining for each base station a corresponding set of neighboring base stations and assigning to each base station those channels assigned to the neighboring base stations in the corresponding set of neighboring base station.

3. The method according to claim 2, wherein the step of establishing for each base station an initial channel access order comprises establishing an order in which channels are assigned to the given base station from the neighboring base stations before calls of the given base station are reassigned to channels of the neighboring base stations.

4. The method according to claim 2, wherein the channels assigned from a neighboring base station are assigned to the given base station in a substantially reverse order than the initial channel access order established for the neighboring base station.

5. The method according to claim 2, wherein calls by the callers are allocated to available channels via a stack discipline, wherein channels in use and reserved are $\alpha(1)$, $\alpha(2)$, ..., $\alpha(k+n)$ and additional calls are sequentially assigned to channels $\alpha(k+n+1)$, $\alpha(k/+, n+2)$, ..., $\alpha(C)$, where C is a total number of channels, n is a number of channels in use, and k channels are reserved, in a given cell in which the initial channel access order is $\alpha = \alpha(1)$, $\alpha(2)$, ..., $\alpha(C)$.

6. The method according to claim 2, wherein each set of neighboring base stations comprises base stations in which shared use of channels will result in interference greater than a predetermined threshold.

7. The method according to claim 6, wherein said predetermined threshold is a signal-to-noise ratio.

8. The method according to claim 6, wherein said predetermined threshold is a bit/frame error rate.

9. The method according to claim 1, wherein the base stations are fixed base stations.

10. The method according to claim 1, wherein the base stations are mobile stations.

11. The method according to claim 1, further including transferring a call in a cell from one channel in use in that cell to another channel assigned to that cell.

12. The method according to claim 11, wherein said transferring step is performed by remote radio retuning.

13. The method according to claim 1, further including detecting channel assignment conflicts utilizing an algebraic structure on the set of channel access orders.

14. A wireless communication network in which service regions are partitioned into a plurality of substantially contiguous cells, each cell having a base station, comprising:

an assigning means for assigning channels to each base station for use by callers within a corresponding cell in accordance with an initial channel assignment scheme satisfying anticipated channel availability, blocking, and interference constraints;

an establishing means for establishing for each base station an initial channel access order establishing an order in which channels allocated by said assigning means are accessed; and a reassigning means for reassigning calls to channels not in actual use or held in a reserved state by a given base station, said channels in actual use and said reserved channels being the first channels listed in said initial channel access order established by said establishing means for the given base station.

15. The wireless communication network according to claim 14, further comprising determining means for determining for each base station a corresponding set of neighboring base stations and a second assigning means for assigning to each base station those channels assigned to the neighboring base stations in the corresponding set of neighboring base stations.

16. The wireless communication network according to claim 15, wherein said establishing means establishes an order in which channels are assigned to the given base station from the neighboring base stations before calls of the given base station are reassigned to channels of the neighboring base stations.

17. The wireless communication network according to claim 15, wherein the channels assigned from a neighboring base station are assigned to the given base station by the second assigning means in a substantially reverse order than the initial channel access order established for the neighboring base station.

18. The wireless communication network according to claim 15, wherein said second assigning means allocates calls by the callers to available channels via a stack discipline, wherein channels in use and reserved are $\alpha(1)$, $\alpha(2)$, ..., $\alpha(k+n)$ and additional calls are sequentially assigned to channels $\alpha(k+n+1)$, $\alpha(k+n+2)$, ..., $\alpha(C)$, where C is a total number of channels, n is a number of channels in use, and k channels are reserved, in a given cell in which the initial channel access order is $\alpha=\alpha(1)$, $\alpha(2)$, ..., $\alpha(C)$.

19. The wireless communication network according to claim 14, further comprising a transferring means for transferring a call in a cell from one channel in use in that cell to another channel assigned to that cell.

\* \* \* \* \*